Oct. 11, 1949.　　　E. L. SCHOFIELD　　　2,484,795
LAWN MOWER HANDLE MOUNTING
Filed Oct. 8, 1945　　　2 Sheets-Sheet 1
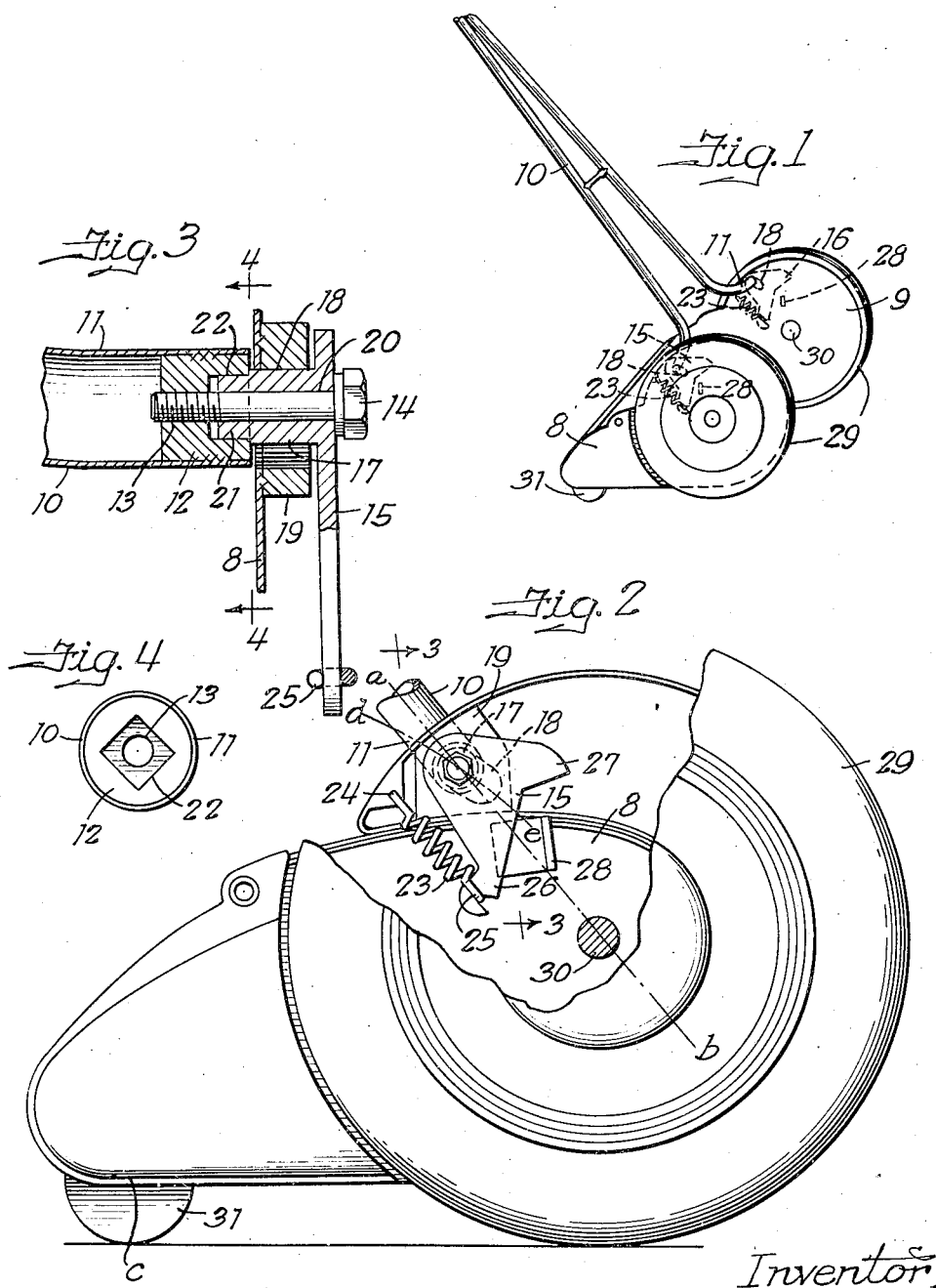
Inventor
Earl L. Schofield

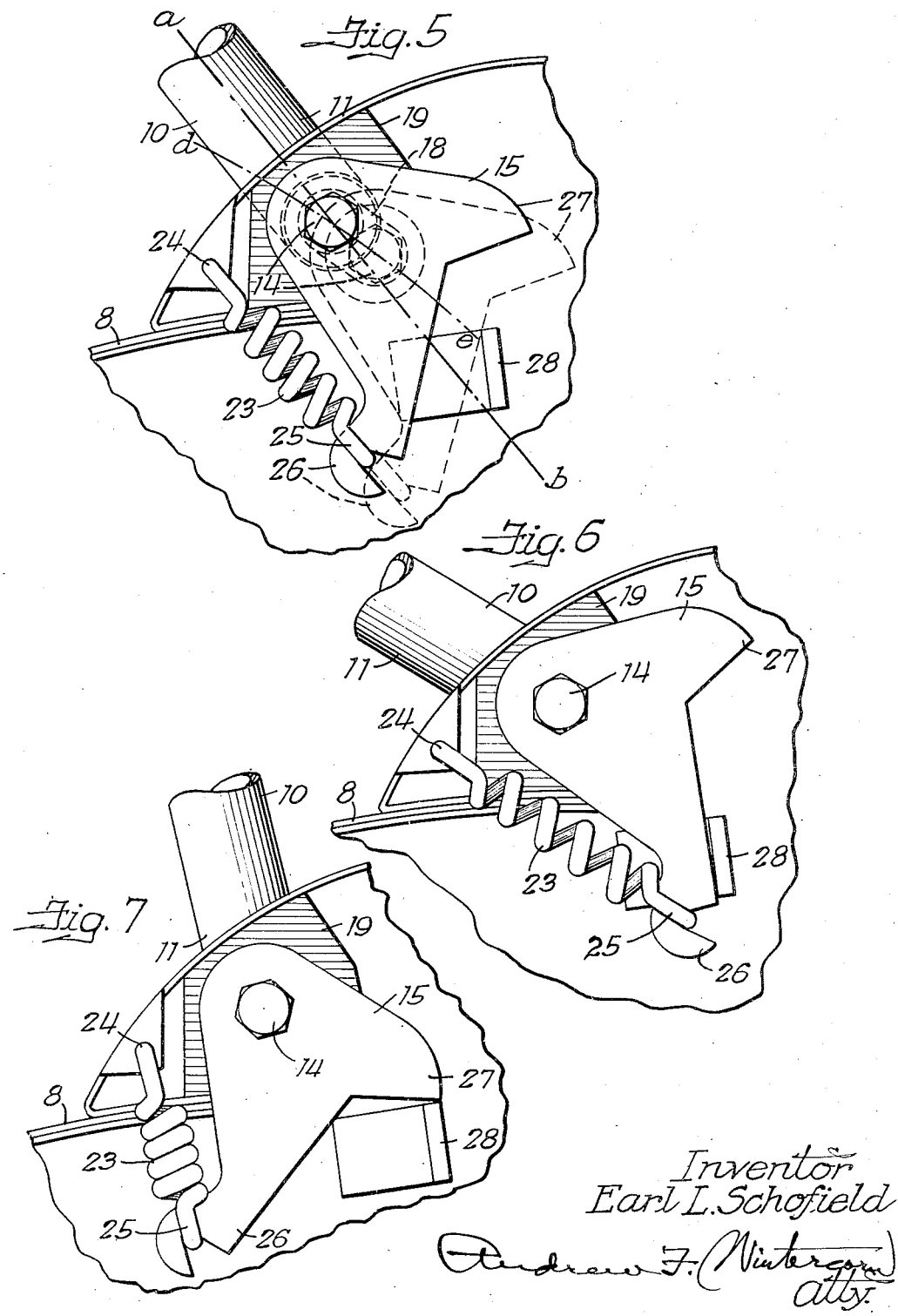

Patented Oct. 11, 1949

2,484,795

UNITED STATES PATENT OFFICE 2,484,795

LAWN MOWER HANDLE MOUNTING

Earl L. Schofield, Rockford, Ill., assignor, by mesne assignments, to Andrew F. Wintercorn, Rockford, Ill.

Application October 8, 1945, Serial No. 621,053

10 Claims. (Cl. 56—249)

This invention relates to lawn mowers, and is more particularly concerned with a new and improved full-floating handle mounting.

There are many unevennesses in the ground in the average lawn and they are the cause of the transmission of innumerable shocks and jars to the operator through the conventional rigid handle, and that accounts in no small measure for the fatigue connected with mowing a lawn. The mower mechanism, furthermore, is responsible for considerable vibration which, with the ordinary conventional handle construction, is transmitted back to the operator. It is, therefore, the principal object of my invention to provide a handle mounting embodying shock absorbing springs to reduce the fatigue in the operation of a lawn mower.

Many lawn mowers have the handles connected thereto in such a way that the line of push is behind the axis of the traction wheels, with a view to keeping the ground roller in firm contact with the ground. However, that has a tendency to increase the drag too much, and, as a result, such mowers work hard. It is, therefore, a further important object of my invention to mount the handle so that the line of push extends through or ahead of the axis of rotation of the traction wheels, whereby to relieve dead load on the ground roller, the aforesaid shock absorbing springs being so connected to the quadrants that are attached to the handle to exert light spring pressure on the frame of the mower to hold the ground roller down in contact with the ground. Any tendency, as in heavy cutting for example, for the ground roller to be lifted off the ground results in increased tensioning of the springs, tending to hold the roller down, so that the cutter-bar is always maintained at a predetermined elevation with respect to the ground.

The quadrants that are attached to the handle and pivot with it relative to the frame of the mower cooperate with projects on the frame to:

(1) Limit lost motion of the handle relative to the frame, whereby positively to limit the stretching of the cushioning springs in the general direction of the line of push, and, (2) Limit the oscillatory movement of the quadrants relative to the frame and accordingly limit the arc of movement of the handle upwardly and downwardly relative to the mower, the handle being automatically moved to a raised parked position at its upper limit of travel by the springs when released.

Another important object of the invention is to locate the handle pivots so as to allow "knee action" of the mower for easier riding over bumps with minimum jolting of the handle so as to reduce fatigue in the operation of the mower, the "knee action" being afforded as a result of the floating handle mounting, and minimum jolting being assured by having the slot in the frame in which the handle pivots are movable disposed on arcs struck with the axis of the ground roller as a center.

The invention is illustrated in the accompanying drawings, in which—

Fig. 1 is a more or less diagrammatic perspective view of a lawn mower equipped with a full-floating handle in accordance with my invention;

Fig. 2 is a side view of the mower on a larger scale with a portion of the wheel in the foreground broken away to disclose the full-floating handle mounting;

Fig. 3 is a sectional detail on the line 3—3 of Fig. 2;

Fig. 4 is a sectional detail on the line 4—4 of Fig. 3, and

Figs. 5, 6 and 7 are enlarged views corresponding to a portion of Fig. 2 illustrating the operation of the handle, Fig. 5 illustrating the shock absorbing action under normal running conditions, and Figs. 6 and 7 illustrating the two limit positions of angular movement of the handle, the handle being in parked position in Fig. 7.

The same reference numerals are applied to corresponding parts throughout the views.

Referring first mainly to Figs. 1 and 2, the reference numerals 8 and 9 designate the right and left sides of the mower frame to which the handle 10 is connected. The handle has outwardly extending coaxially aligned tubular lower end portions 11 in which bushings 12 are welded or otherwise suitably secured having threaded center holes 13 adapted to receive the threaded ends of bolts 14 for the detachable fastening of quadrants 15 and 16 to the handle and at the same time pivotally connects the handle to the lawn mower frame, the quadrants 15 and 16 having cylindrical bearing bosses 17 formed integral therewith and arranged to turn and also slide in elongated slots 18 provided therefor in bearing blocks 19 that are welded or otherwise suitably secured to the side portions 8 and 9 of the lawn mower frame. The bolts 14 extend through center holes 20 in the bosses 17 that are aligned with the center holes 13 in the bushings 12, and there are reduced square end portions 21 on the bosses 17 arranged to fit in square sockets 22 provided therefor in the bushings 12, whereby to positively connect the quadrants 15 and 16 to turn with the handle 10 relative to the frame, the quadrants 15 and 16 being, of course, in properly indexed relation to the handle to operate in a predetermined arc relative to said frame, as will soon appear. Coiled tension springs 23 have one end 24 pivotally connected to the lawn mower frame, and the other end 25 hooked onto one arm 26 of the quadrants 15 and 16, said quadrants being generally V-shaped and each providing a second arm 27 in angularly spaced relation to the arm 26. The side portions 8 and 9 of the frame both have stop projections 28 provided thereon between the arms 26 and 27 to engage these arms to limit oscillatory movement of the quadrants relative to the frame, as illustrated in Figs. 6 and 7, these projections serving also to limit the spring restrained lost motion of the handle relative to the frame by abutment with the quadrants, as illustrated in Fig. 5, the projections 28 being approximately in alignment with the handle 10 so as to come in contact with the quadrants 15 and 16 when the handle is subjected to unusually heavy pressure. The line of push under ordinary operating conditions is indicated in Figs. 2 and 5 by the line $a$—$b$, and, as appears in Fig. 2, this line passes through or slightly ahead of the axis of rotation of the traction wheels 29, one of the axles for these wheels being indicated at 30 in Fig. 2. This arrangement of the handle with respect to the wheels relieves dead load on the ground roller 31 and accordingly makes for easier pushing of the mower. It will, however, be evident that since the springs 23 which cushion the handle 10 are connected to the quadrants 15 and 16 behind the line of push $a$—$b$, these springs exert a light spring pressure downwardly on the frame with respect to the axles 30, so as to tend to hold the ground roller 31 down against the ground. In heavy cutting, if the roller 31 tends to be lifted off the ground, the springs 23 are stretched further so as to counteract this tendency and accordingly keeps the roller 31 in contact with the ground at all times. The cutter-bar is, therefore, kept at the correct elevation with respect to the ground for even cutting of the grass.

In operation, under normal operating conditions the handle 10 is on the line $a$—$b$ or is turned to a position slightly above or below that line, and the slots 18 allow a certain freedom of endwise movement of the handle relative to the frame, as indicated in Fig. 5 by the full line and dotted line positions. This full-floating action is restrained, however, by the springs 23 and, therefore, all of the thrust is transmitted through these springs and they accordingly relieve the handle of shocks and jars of mowing, whether they be due to the rolling of the mower over uneven ground or due to the vibration of the mower mechanism, which vibration would otherwise be transmitted directly through the handle to the operator. The operator is, therefore, less apt to experience fatigue in the operation of the mower. The stretch of the springs 23 is positively limited when the quadrants 15 and 16 come into engagement with the stop projections 28, as indicated in Fig. 5, so that there is no danger of stretching the springs too far. It is important in this connection to note that the slots 18 extend on arcs $d$—$e$ that are struck with the axis $c$ of the ground roller 31 as a center, thus allowing "knee action" of the mower for easy riding over bumps without much jolting of the handle, because obviously as either of the wheels 29 rides over a bump the frame of the mower pivots with respect to the axis $c$ of the ground roller 31. The projections 28, furthermore serve to limit the swinging of the handle relative to the mower as, for example, in mowing on steep terraces, Fig. 6 illustrating the lower limit of movement of the handle when the arms 26 strike the stops 28, and Fig. 7 illustrating the other extreme position when the arms 27 strike the stops 28. Fig. 7 is the parked position of the handle, and it should be clear from a comparison of Figs. 5 and 6 with Fig. 7 that if the handle is released the springs 23 will automatically swing the handle up to the parked position. The springs, therefore, counterbalance the weight of the handle in the normal operating position and relieve the operator of that load, thus further lightening his task in the mowing of the lawn. The fact that the handle automatically moves to a raised parked position under action of the springs is, of course, of considerable advantage, because it enables the parking of the mower in a small space in a garage or tool shed without likelihood of the handle exerting a pressure against the wall tending to cause the mower to roll away from the wall.

It is believed the foregoing description conveys a good understanding of the objects and advantages of my invention. The appended claims have been drawn to cover all legitimate modifications and adaptations.

I claim:

1. In a lawn mower handle mounting, the combination of spaced frame side portions having bearings thereon with elongated slots provided therein, a handle having a forked lower end providing coaxially arranged pivot portions thereon slidably and pivotally engaged in said slots, forked members fixed on said pivot portions to turn and slide relative to said bearings with the handle pivot portions, the side portions of said forked members engaging said frame at opposite extremes of pivotal movement of said handle to limit such movement, and spring means resisting sliding movement of said handle pivot portions.

2. In a lawn mower handle mounting, the combination of spaced frame side portions having bearings thereon with elongated slots provided therein, a handle having a forked lower end providing coaxially arranged pivot portions thereon slidably and pivotally engaged in said slots, forked members fixed on said pivot portions to turn and slide relative to said bearings with the handle pivot portions, the side portions of said forked members engaging said frame at opposite extremes of pivotal movement of said handle to limit such movement, and spring means connecting said handle and frame so as to resist endwise movement of said handle and tend to swing said handle toward one limit position.

3. In a lawn mower handle mounting, the combination of spaced frame side portions having bearings thereon with elongated slots provided therein that have upward and rearward inclination generally on an arc struck with the axis of a trailing ground roller on the mower as a center, a handle having a forked lower end providing coaxially arranged pivot portions thereon slidably and pivotally engaged in said slots, forked members fixed on said pivot portions to turn and slide relative to said bearings with the handle pivot portions, the side portions of said forked members engaging said frame at opposite extremes of pivotal movement of said handle to limit such movement, and spring means resisting sliding movement of said handle pivot portions.

4. In a lawn mower handle mounting, the combination of spaced frame side portions having bearings thereon with elongated slots provided therein that have upward and rearward inclination, a handle having a forked lower end providing coaxially arranged pivot portions thereon slidably and pivotally engaged in said slots, forked members fixed on said pivot portions to turn and slide relative to said bearings with the handle pivot portions, the side portions of said forked members engaging said frame at opposite extremes of pivotal movement of said handle to limit such movement, and spring means resisting sliding movement of said handle pivot portions.

5. In a lawn mower handle mounting, the combination of spaced frame side portions having bearings thereon with elongated slots provided therein that have upward and rearward inclination generally on an arc struck with the axis of a trailing ground roller on the mower as a center, a handle having a forked lower end providing coaxially arranged pivot portions thereon slidably and pivotally engaged in said slots, forked members fixed on said pivot portions to turn and slide relative to said bearings with the handle pivot portions, the side portions of said forked members engaging said frame at opposite extremes of pivotal movement of said handle to limit such movement, and spring means connecting said handle and frame so as to resist endwise movement of said handle and tend to swing said handle toward one limit position.

6. In a lawn mower handle mounting, the combination of spaced frame side portions having bearings thereon with elongated slots provided therein that have upward and rearward inclination, a handle having a forked lower end providing coaxially arranged pivot portions thereon slidably and pivotally engaged in said slots, forked members fixed on said pivot portions to turn and slide relative to said bearings with the handle pivot portions, the side portions of said forked members engaging said frame at opposite extremes of pivotal movement of said handle to limit such movement, and spring means connecting said handle and frame so as to resist endwise movement of said handle and tend to swing said handle toward one limit position.

7. In a lawn mower handle mounting, the combination of spaced frame side portions having bearings thereon with elongated slots provided therein, a handle having a forked lower end providing coaxially aligned polygonal sockets, forked members having cylindrical bearing portions slidably and pivotally engaged in said slots and having reduced polygonal end portions in coaxial relation to the bearing portions closely received in said sockets, means securing said forked members to the handle so as to turn by means of their bearing portions and slide in said slots, the side portions of said forked members engaging said frame at opposite extremes of pivotal movement of said handle to limit such movement, and spring means resisting sliding movement of said handle pivot portions.

8. In a lawn mower handle mounting, the combination of spaced frame side portions having bearings thereon with elongated slots provided therein, a handle having a forked lower end providing coaxially aligned polygonal sockets, forked members having cylindrical bearing portions slidably and pivotally engaged in said slots and having reduced polygonal end portions in coaxial relation to the bearing portions closely received in said sockets, means securing said forked members to the handle so as to turn by means of their bearing portions and slide in said slots, the side portions of said forked members engaging said frame at opposite extremes of pivotal movement of said handle to limit such movement, and spring means connecting said handle and frame so as to resist endwise movement of said handle and tend to swing said handle toward one limit position.

9. In a lawn mower handle mounting, the combination of a frame member having a bearing slot provided therein, a handle fork having a polygonal socket provided therein in register with the slot on one side of the frame member, a forked member on the other side of the frame member having a bearing portion projecting therefrom and received in said bearing slot to turn and slide therein and having a coaxial reduced polygonal end portion closely received in said socket, and a through-bolt extending through the bearing portion of the worked member and threaded in the handle fork.

10. In a lawn mower handle mounting, the combination of a frame member having a bearing slot provided therein, a handle fork having a polygonal socket provided therein in register with the slot on one side of the frame member, a forked member on the other side of the frame member having a bearing portion projecting therefrom and received in said bearing slot to turn and slide therein and having a coaxial reduced polygonal end portion closely received in said socket, and means for fastening the handle fork to the forked member.

EARL L. SCHOFIELD.

REFERENCES CITED

The following references are of record in the file of this patent:

UNITED STATES PATENTS

| Number | Name | Date |
|---|---|---|
| 1,914,782 | McCarty | June 20, 1933 |
| 2,347,991 | Cummings | May 2, 1944 |

FOREIGN PATENTS

| Number | Country | Date |
|---|---|---|
| 195,754 | Great Britain | Apr. 6, 1923 |